(12) United States Patent
Venkata et al.

(10) Patent No.: US 12,335,372 B2
(45) Date of Patent: Jun. 17, 2025

(54) COMMON SYMMETRIC MEMORY KEY FOR PARALLEL PROCESSES

(71) Applicant: MELLANOX TECHNOLOGIES, LTD., Yokneam (IL)

(72) Inventors: Manjunath Gorentla Venkata, San Ramon, CA (US); Artem Yurievich Polyakov, San Francisco, CA (US); Subhadeep Bhattacharya, Santa Clara, CA (US); Gil Bloch, Zichron Yaakov (IL); William Ferrol Aderholdt, Brentwood, CA (US)

(73) Assignee: Mellanox Technologies, Ltd., Yokneam (IL)

( * ) Notice: Subject to any disclaimer, the term of this patent is extended or adjusted under 35 U.S.C. 154(b) by 233 days.

(21) Appl. No.: 18/176,521

(22) Filed: Mar. 1, 2023

(65) Prior Publication Data
US 2024/0297781 A1 Sep. 5, 2024

(51) Int. Cl.
*H04L 9/08* (2006.01)
*H04L 9/14* (2006.01)

(52) U.S. Cl.
CPC ............. *H04L 9/0819* (2013.01); *H04L 9/14* (2013.01); *H04L 2209/125* (2013.01)

(58) Field of Classification Search
CPC .... H04L 9/0819; H04L 9/14; H04L 2209/125
See application file for complete search history.

(56) References Cited

U.S. PATENT DOCUMENTS

| | | | | |
|---|---|---|---|---|
| 11,792,003 | B2 * | 10/2023 | Zheng | H04L 9/3242 |
| | | | | 713/193 |
| 2013/0185381 | A1 * | 7/2013 | Aho | G06F 8/63 |
| | | | | 709/217 |
| 2016/0239430 | A1 * | 8/2016 | Tsirkin | G06F 12/109 |
| 2019/0384923 | A1 * | 12/2019 | Leitao | G06F 21/606 |
| 2020/0242258 | A1 * | 7/2020 | Smith | H04L 9/3268 |

OTHER PUBLICATIONS

Taranov, Konstantin, et al. "{sRDMA}—Efficient {NIC-based} Authentication and Encryption for Remote Direct Memory Access." 2020 USENIX Annual Technical Conference (USENIX ATC 20). (Year: 2020).*
Schuh, Henry N., et al. "Xenic: SmartNIC-accelerated distributed transactions." Proceedings of the ACM SIGOPS 28th Symposium on Operating Systems Principles. (Year: 2021).*
Diamond, Noah, Scott Graham, and Gilbert Clark. "Securing InfiniBand traffic with BlueField-2 data processing units." International Conference on Critical Infrastructure Protection. Cham: Springer Nature Switzerland. (Year: 2022).*

* cited by examiner

*Primary Examiner* — John M MacIlwinen
(74) *Attorney, Agent, or Firm* — Meitar Patents Ltd.; Daniel Kligler

(57) ABSTRACT

In one embodiment, a parallel computing system includes a key manager to assign symmetric memory keys to parallel computing jobs including a first symmetric memory key to a first parallel computing job, and a plurality of server nodes to execute parallel computing processes of the first parallel computing job, and cause registration of host memory regions of the server nodes with the assigned first symmetric memory key in corresponding network interface controllers of the server nodes so that different ones of the host memory regions are accessible with the first symmetric memory key by remote ones of the server nodes using remote direct memory access.

26 Claims, 8 Drawing Sheets

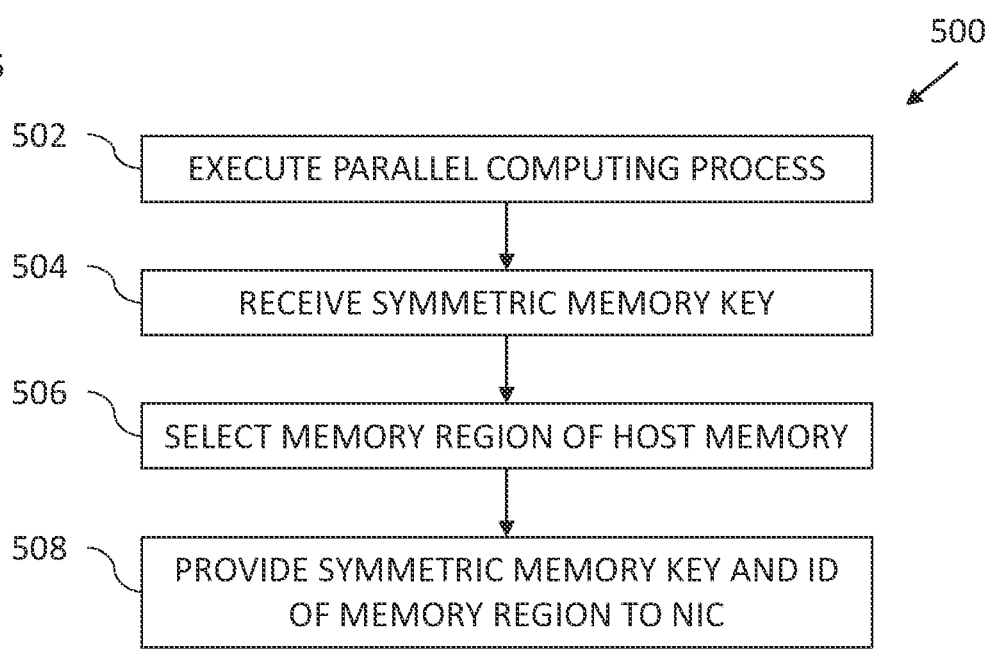
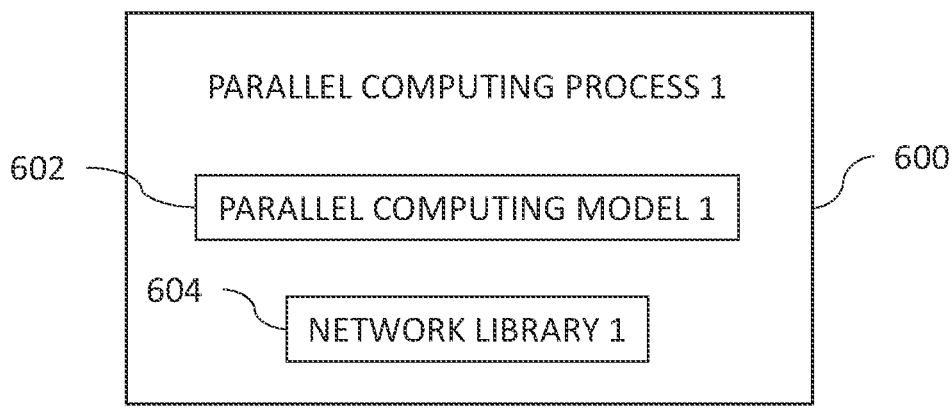
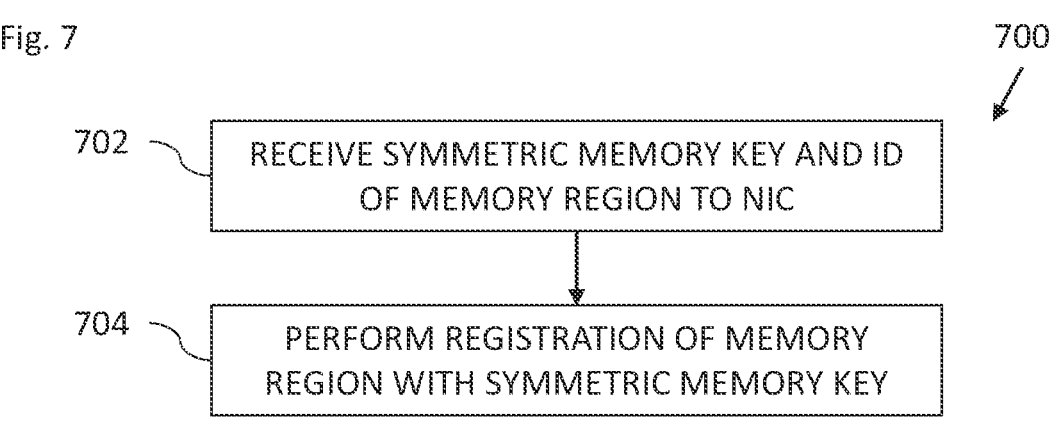

COMMON SYMMETRIC MEMORY KEY FOR PARALLEL PROCESSES

FIELD OF THE INVENTION

The present invention relates to computer systems, and in particular, but not exclusively, to remote memory access.

BACKGROUND

An end point device, such as a management node, may initiate a parallel computing job with other end point device across a network. In addition to the other end point devices participating in the parallel computing job, switches in the network may also participate in the parallel computing job by providing the various end point devices with the necessary data to perform the parallel computing job and also by performing such tasks as addition.

Parallel computing jobs may use remote direct memory access (RDMA) for data transfers between processes running on different end point devices. Advanced network interface controllers (NICs) are designed to support RDMA operations, in which the NIC transfers data by direct memory access from the memory of one computer into that of another.

InfiniBand and other RDMA-capable networks require pinning (e.g., registering) a remotely accessible memory to implement Remote Memory Access (RMA). During the data transfer, the RMA initiator needs a remote key (RKey) to access the corresponding memory. In current parallel programming models, each process participating in the job generates a unique RKey per remotely accessible memory region. For example, a Host Channel Adapter (HCA) or network interface controller (NIC) provides an RKey to its local process running on a local host in response to a registration request from the local process to register a memory region of the local host memory. The different processes distribute the different RKeys for the job among themselves in order to facilitate RDMA data transfers between the processes on different hosts. Each process stores a mapping table (RKey table) containing the RKeys of all memory regions of the different processes on the different hosts participating in the job. The RKey table's size scales linearly with the number of memory regions and processes in the job. The combined size of all RKey tables on a High-Performance Computing (HPC) compute node can grow up to the order of hundreds of Gigabytes. Moreover, as the RKey table is searched on every network (RDMA) operation, this causes cache thrashing impacting not only the network operations but also the compute part of the job.

SUMMARY

There is provided in accordance with an embodiment of the present disclosure, a parallel computing system, including a key manager to assign symmetric memory keys to parallel computing jobs including a first symmetric memory key to a first parallel computing job, and a plurality of server nodes to execute parallel computing processes of the first parallel computing job, and cause registration of host memory regions of the server nodes with the assigned first symmetric memory key in corresponding network interface controllers of the server nodes so that different ones of the host memory regions are accessible with the first symmetric memory key by remote ones of the server nodes using remote direct memory access.

Further in accordance with an embodiment of the present disclosure the server nodes include a first server node and a second server node, the first server node being to access one of the host memory regions of the second server node using remote direct memory access with the first symmetric memory key.

Still further in accordance with an embodiment of the present disclosure the server nodes include a first server node having a first host memory and a first network interface controller, and a second server node having a second host memory and a second interface controller, the first network interface controller and the second interface controller providing network access to the first server node and the second server node, respectively, and wherein the first server node is to execute a first parallel computing process of the first parallel computing job, receive the first symmetric memory key, select a first memory region of the first host memory, and provide the first symmetric memory key and an identification of the first memory region to the first network interface controller, the first network interface controller is to receive the first symmetric memory key and the identification of the first memory region, and perform a first registration of the first memory region with the first symmetric memory key, the second server node is to execute a second parallel computing process of the first parallel computing job, receive the first symmetric memory key, select a second memory region of the second host memory, and provide the first symmetric memory key and an identification of the second memory region to the second network interface controller, and the second network interface controller is to receive the first symmetric memory key and the identification of the second memory region, and perform a second registration of the second first memory region with the first symmetric memory key.

Additionally in accordance with an embodiment of the present disclosure the first network interface controller is to receive from a third parallel computing process of the first parallel computing job a first remote direct memory access request including the first symmetric memory key, and the second network interface controller is to receive from a fourth parallel computing process of the first parallel computing job a second remote direct memory access request including the first symmetric memory key.

Moreover, in accordance with an embodiment of the present disclosure the first network interface controller is to receive from a third parallel computing process of the first parallel computing job a first remote direct memory access request including the first symmetric memory key, find the first memory region based on the first symmetric memory key included in the first remote direct memory access request and the first registration, and write data to, or retrieve data from, the first memory region of the first host memory responsively to the found first memory region and the first remote direct memory access request, and the second network interface controller is to receive from a fourth parallel computing process of the first parallel computing job a second remote direct memory access request including the first symmetric memory key, find the second memory region based on the first symmetric memory key included in the second remote direct memory access request and the second registration, and write data to, or retrieve data from, the second memory region of the second host memory responsively to the found second memory region and the second remote direct memory access request.

Further in accordance with an embodiment of the present disclosure the first parallel computing process includes a first parallel computing model and a first network library, the first parallel computing model is to receive the first symmetric memory key, select the first memory region of the first host memory, and provide the first symmetric memory key and the identification of the first memory region to the first network library, the first network library is to provide the first symmetric memory key and the identification of the first memory region to the first network interface controller, the second parallel computing process includes a second parallel computing model and a second network library, the second parallel computing model is to receive the first symmetric memory key, select the second memory region of the second host memory, and provide the first symmetric memory key and the identification of the second memory region to the second network library, and the second network library is to provide the first symmetric memory key and the identification of the second memory region to the second network interface controller.

Still further in accordance with an embodiment of the present disclosure the key manager is to maintain a list of which of the symmetric memory keys are unassigned to active parallel computing jobs and which of the symmetric memory keys are assigned to the active parallel computing jobs, and assign one of the unassigned symmetric memory keys to the first parallel computing job.

Additionally in accordance with an embodiment of the present disclosure, the system includes a resource manager to establish the parallel computing processes of the first parallel computing job on the server nodes, request an unassigned symmetric memory key from the key manager for the first parallel computing job, receive the first symmetric memory key from the key manager for the first parallel computing job, and provide the first symmetric memory key to the parallel computing processes of the first parallel computing job running on the server nodes, wherein the key manager is to indicate in the list that the first symmetric memory key is assigned to the first parallel computing job.

Moreover, in accordance with an embodiment of the present disclosure the key manager is to assign the same symmetric memory key to two different parallel computing jobs which do not use one or more common ones of the network interface controllers.

Further in accordance with an embodiment of the present disclosure the key manager is to assign multiple symmetric memory keys to the first parallel computing job, wherein each of the server nodes is to cause registration of the multiple memory keys with corresponding multiple memory regions in a corresponding one of the network interface controllers.

There is also provided in accordance with another embodiment of the present disclosure, a server node device, including a network interface controller to send and receive packets over a network, and a host memory, and a processor to execute a first parallel computing process of a parallel computing job, receive a symmetric memory key from a key manager, cause registration of a host memory region of the host memory with the symmetric memory key in the network interface controller so that the host memory region is accessible via the network interface controller by different remote server nodes with the symmetric memory key using remote direct memory access, send a first remote direct memory access request including the symmetric memory key to access a host memory of a first remote server node executing a second parallel computing process of the parallel computing job with the symmetric memory key, and send a second remote direct memory access request including the symmetric memory key to access a host memory of a second remote server node executing a third parallel computing process of the parallel computing job with the symmetric memory key.

Still further in accordance with an embodiment of the present disclosure the processor is to select the memory region of the host memory, and provide the symmetric memory key and an identification of the memory region to the network interface controller, and the network interface controller is to receive the symmetric memory key and the identification of the memory region, and perform the registration of the memory region with the symmetric memory key.

Additionally in accordance with an embodiment of the present disclosure the first parallel computing process includes a first parallel computing model and a first network library.

Moreover, in accordance with an embodiment of the present disclosure the first parallel computing model is to receive the symmetric memory key, select the memory region of the host memory, and provide the symmetric memory key and the identification of the memory region to the first network library, and the first network library is to provide the symmetric memory key and the identification of the memory region to the network interface controller.

There is also provided in accordance with still another embodiment of the present disclosure, a parallel computing method, including assigning symmetric memory keys to parallel computing jobs including a first symmetric memory key to a first parallel computing job, executing parallel computing processes of the first parallel computing job, causing registration of host memory regions of server nodes with the assigned first symmetric memory key in corresponding network interface controllers of the server nodes so that different ones of the host memory regions are accessible with the first symmetric memory key by remote ones of the server nodes using remote direct memory access.

Further in accordance with an embodiment of the present disclosure, the method includes accessing, by a first server node, a host memory region of a second server node using remote direct memory access with the first symmetric memory key.

Still further in accordance with an embodiment of the present disclosure, the method includes by a first server node executing a first parallel computing process of the first parallel computing job, receiving the first symmetric memory key, selecting a first memory region of a first host memory of the first server node, and providing the first symmetric memory key and an identification of the first memory region to a first network interface controller of the first server node, by the first network interface controller receiving the first symmetric memory key and the identification of the first memory region, and performing a first registration of the first memory region with the first symmetric memory key, by a second server node executing a second parallel computing process of the first parallel computing job, receiving the first symmetric memory key, selecting a second memory region of a second host memory of the second server node, and providing the first symmetric memory key and an identification of the second memory region to a second network interface controller of the second server node, and by the second network interface controller receiving the first symmetric memory key and the identification of the second memory region, and performing a second registration of the second first memory region with the first symmetric memory key.

Additionally in accordance with an embodiment of the present disclosure, the method includes receiving, by the first network interface controller, from a third parallel computing process of the first parallel computing job a first remote direct memory access request including the first symmetric memory key, and receiving, by the second network interface controller, from a fourth parallel computing process of the first parallel computing job a second remote direct memory access request including the first symmetric memory key.

Moreover in accordance with an embodiment of the present disclosure, the method includes by the first network interface controller receiving from a third parallel computing process of the first parallel computing job a first remote direct memory access request including the first symmetric memory key, finding the first memory region based on the first symmetric memory key included in the first remote direct memory access request and the first registration, and writing data to, or retrieving data from, the first memory region of the first host memory responsively to the found first memory region and the first remote direct memory access request, and by the second network interface controller receiving from a fourth parallel computing process of the first parallel computing job a second remote direct memory access request including the first symmetric memory key, finding the second memory region based on the first symmetric memory key included in the second remote direct memory access request and the second registration, and writing data to, or retrieving data from, the second memory region of the second host memory responsively to the found second memory region and the second remote direct memory access request.

Further in accordance with an embodiment of the present disclosure the first parallel computing process includes a first parallel computing model and a first network library, the second parallel computing process including a second parallel computing model and a second network library, the method further including by the first parallel computing model receiving the first symmetric memory key, selecting the first memory region of the first host memory, and providing the first symmetric memory key and the identification of the first memory region to the first network library, providing, by the first network library, the first symmetric memory key and the identification of the first memory region to the first network interface controller, by the second parallel computing model receiving the first symmetric memory key, selecting the second memory region of the second host memory, and providing the first symmetric memory key and the identification of the second memory region to the second network library, and providing, by the second network library, the first symmetric memory key and the identification of the second memory region to the second network interface controller.

Still further in accordance with an embodiment of the present disclosure, the method includes maintaining a list of which of the symmetric memory keys are unassigned to active parallel computing jobs and which of the symmetric memory keys are assigned to the active parallel computing jobs, and assigning one of the unassigned symmetric memory keys to the first parallel computing job.

Additionally in accordance with an embodiment of the present disclosure, the method includes establishing the parallel computing processes of the first parallel computing job on the server nodes, requesting an unassigned symmetric memory key from a key manager for the first parallel computing job, receiving the first symmetric memory key from the key manager for the first parallel computing job, providing the first symmetric memory key to the parallel computing processes of the first parallel computing job running on the server nodes, and indicating in the list that the first symmetric memory key is assigned to the first parallel computing job.

Moreover, in accordance with an embodiment of the present disclosure, the method includes assigning the same symmetric memory key to two different parallel computing jobs which do not use one or more common ones of the network interface controllers.

Further in accordance with an embodiment of the present disclosure, the method includes assigning multiple symmetric memory keys to the first parallel computing job, and causing registration of the multiple memory keys with corresponding multiple memory regions in a corresponding one of the network interface controllers.

There is also provided in accordance with still another embodiment of the present disclosure a parallel computing method, including sending and receiving packets over a network, executing a first parallel computing process of a parallel computing job, receiving a symmetric memory key from a key manager, causing registration of a host memory region of a host memory with the symmetric memory key in a network interface controller so that the host memory region is accessible via the network interface controller by different remote server nodes with the symmetric memory key using remote direct memory access, sending a first remote direct memory access request including the symmetric memory key to access a host memory of a first remote server node executing a second parallel computing process of the parallel computing job with the symmetric memory key, and sending a second remote direct memory access request including the symmetric memory key to access a host memory of a second remote server node executing a third parallel computing process of the parallel computing job with the symmetric memory key.

Still further in accordance with an embodiment of the present disclosure, the method includes selecting the memory region of the host memory, providing the symmetric memory key and an identification of the memory region to the network interface controller, receiving, by the network interface controller, the symmetric memory key, and the identification of the memory region, and performing the registration of the memory region with the symmetric memory key.

BRIEF DESCRIPTION OF THE DRAWINGS

The present invention will be understood from the following detailed description, taken in conjunction with the drawings in which:

FIG. 5 is a flowchart including steps in a method performed by a processor in a server node of the system of FIG. 1 to initiate memory key registration;

FIG. 6 is a block diagram view of a parallel computing process for use in the system of FIG. 1;

FIG. 7 is a flowchart including steps in a method performed by a network interface controller in a server node of the system of FIG. 1 performing memory key registration;

DESCRIPTION OF EXAMPLE EMBODIMENTS

Overview

Figure 1:
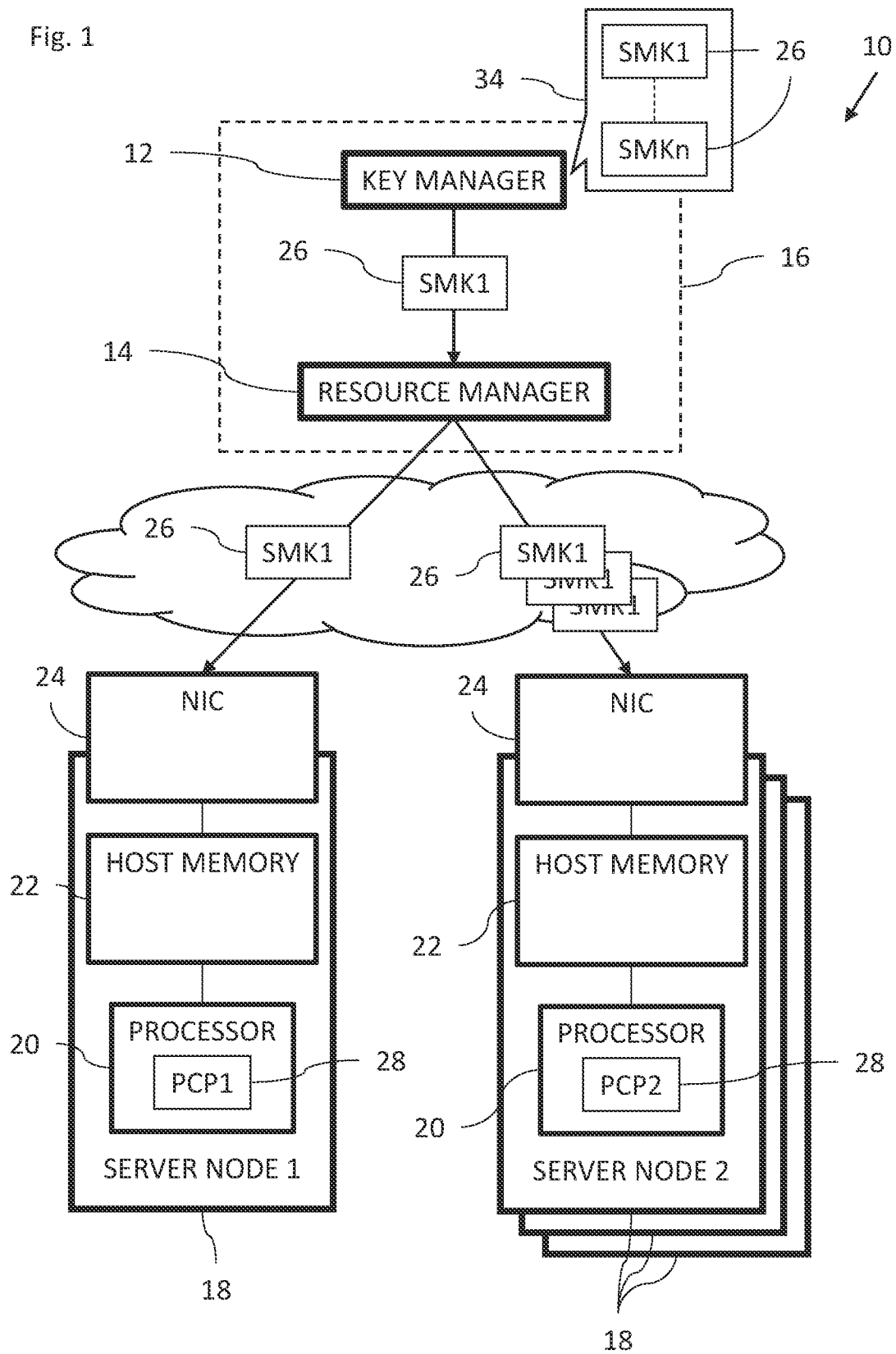
FIG. 1 is a block diagram view of a parallel computing system constructed and operative in accordance with an embodiment of the present invention.

For RDMA transfers, the underlying networks require HPC software such as network libraries, and programming model implementations to register and pin the data buffers' memory. On registering and pinning, the information required to access this memory remotely is encapsulated in an RKey object.

A parallel application is a set of processes on different central processing unit (CPU) cores either in the same or different nodes working together to solve a single problem. The parallel application is comprised of Execution Units (EUs) that perform computation and initiate communications. The EUs are typically represented by an operating system (OS) processes or threads. Although a job may include one or more parallel applications, it should be noted that for the sake of simplicity the terms "job", "parallel computing job", "parallel application" and "application" are used interchangeably herein assuming that a job includes a single parallel application. However, it should be noted that embodiments of the present invention may be used with a job including multiple parallel applications.

For a typical parallel application with many Execution Units often ranging from a few thousand to millions, each of the EUs is required to hold the RKey for every memory region accessed with RDMA operations. In combination with software meta-information associated with each RKey in existing implementations, this results in each process holding a large number of RKeys and causing significant memory overhead. A typical RKey table memory consumption increases with the number of processes and RDMA-exposed memory regions in the parallel application which, as mentioned earlier, can be an order of millions and is typically proportional to the number of CPU cores used by clusters and supercomputers. The combined size of all RKey tables on a High-Performance Computing (HPC) compute node can grow up to the order of hundreds of Gigabytes. Moreover, as RKey table is searched on every network (RDMA) operation, this causes cache thrashing impacting not only the network operations but also the compute part of the application or job.

Therefore, embodiments of the present invention solve at least some of the above drawbacks by using a single memory key (termed "symmetric memory key" or "SM key") for use by all the processes of a job to provide remote direct memory access to host memory instead of using RKeys which are unique to each registered host memory region for each process of the job. The SM key includes information for accessing a single memory region per process (e.g., EU) for all the processes (e.g., EUs) in the job. As a consequence, it is not required to build and maintain an RKey table.

It was mentioned previously that although in some cases a job includes multiple parallel applications, for the sake of simplicity the terms "job", "parallel computing job", "parallel application" and "application" are used interchangeably herein based on the assumption that a job generally includes a single parallel application. In some embodiments where a job includes multiple parallel applications, an SM Key is used for all the processes in each parallel application in that job.

In some embodiments, a resource manager requests a new SM key for a new job from a key manager. The resource manager may provide other functions such as establishing parallel computing processes of the new job on server nodes. The key manager tracks which SM keys have been assigned to jobs and provides an unassigned SM key to the new job. When a job completes processing, the SM key assigned to that job generally returns to the pool of unassigned SM keys.

In some embodiments, the same SM key may be assigned for use by different jobs if the different jobs are not accessing a common NIC. The same SM key cannot be used by different jobs if those jobs are accessing one or more same NICs. Therefore, in some embodiments, the key manager tracks the use of SM Keys assigned to jobs and the NICs and/or server nodes participating in the jobs.

In some embodiments, the resource manager may request that more than one SM key from the key manager be assigned to a parallel application in order to provide more memory regions for use by that parallel application during execution. For example, a parallel application may be assigned SM Key 1A for registering with a first memory region and SM Key 1B for registering with a second memory region, and so on. In such a case, an RDMA request for the parallel application may use SM Key 1A or SM Key 1B.

In some embodiments, the resource manager may request one or more additional SM Keys while a job is already running, for example, if there is an additional memory need.

In some embodiments, the resource manager receives the new SM key from the key manager and distributes the received SM Key to the processes of the job running on the different server nodes. In each server, a process (of the new job) (e.g., EU) running on that server selects a memory region in its local host memory and provides the new SM key and an identification (ID) of the selected memory region to the NIC of that server. The NIC then registers the new SM key with the selected memory region. In such a manner all the memory regions on all the servers participating in this new job can access the host memory of each other using the SM key as each local NIC knows the mapping between the SM key and the memory region in its local host memory assigned to be used by the new job.

In some embodiments, the EU runs some HPC software stack including a parallel programming model and network library which may cause the NIC to register the SM Key with the selected memory region. For example, the parallel programming model may deliver the selected memory region and new SM key to the network library, which programs the NIC with this information to register the SM key with the selected memory region in NIC memory.

System Description

Reference is now made to FIG. 1, which is a block diagram view of a parallel computing system 10 constructed and operative in accordance with an embodiment of the present invention.

The system 10 includes a key manager 12, a resource manager 14, and a plurality of server nodes 18. The key manager 12 and the resource manager 14 may be disposed in independent network nodes or servers, or may be disposed in the same network node 16 or server. Each server node 18 includes a processor 20 (e.g., central processing unit (CPU) and/or graphics processing unit (GPU) or Field Programmable Gate Array(s) (FPGA(s)) and/or accelerator(s)), host memory 22, and network interface controller (NIC) 24. The network interface controller 24 of each server node 18 provides network access for its server node 18, and is configured to send and receive packets over a network.

In practice, some or all of the functions of the processor 20 may be combined in a single physical component or, alternatively, implemented using multiple physical components. These physical components may comprise hard-wired or programmable devices, or a combination of the two. In some embodiments, at least some of the functions of the processor 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The processors 20 of the server nodes 18 execute parallel computing processes of one or more parallel computing jobs, e.g., parallel computing job 1. The key manager 12 is configured to assign symmetric memory keys (SMKs) 26 (e.g., upon receiving requests from the resource manager 14) to the parallel computing jobs including SMK1 to parallel computing job 1. Each processor 20 shown in FIG. 1 is shown executing a parallel computing process (PCP) 28. For example, the processor 20 of server node 1 is shown executing PCP1 and the processor 20 of server node 2 is shown executing PCP2.

As will be described in more detail below with reference to FIG. 4, the server nodes 18 cause registration of respective host memory regions of the host memories 22 of the server nodes 18 with the assigned SMK1 in the corresponding network interface controllers 24 of the server nodes 18 so that different host memory regions are accessible with SMK1 by remote server nodes 18 using remote direct memory access. In other words, each server node 18 causes registration of its local host memory region with the assigned SMK1 in its network interface controller 24 so that its host memory region is accessible with SMK1 by remote server nodes 18 using remote direct memory access. For example, server node 1 is configured to access the host memory region of server node 2 using remote direct memory access with SMK1. Memory registration is described in more detail below.

Figure 2:
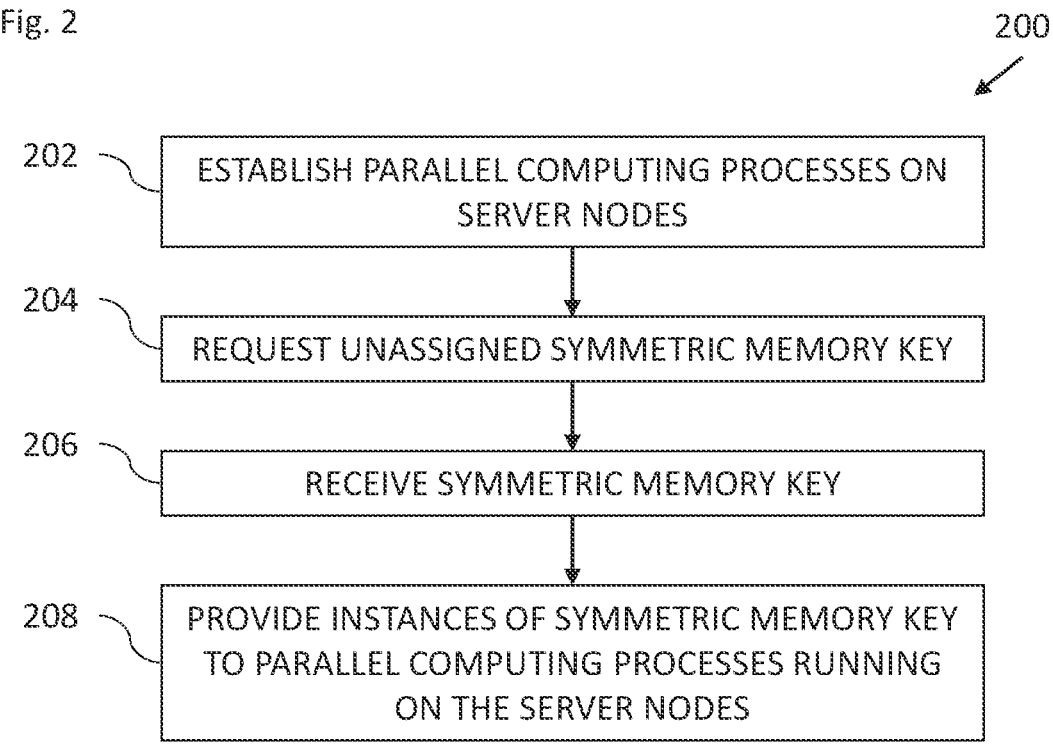
FIG. 2 is a flowchart including steps in a method performed by a resource manager in the system of FIG. 1.

Reference is now made to FIG. 2, which is a flowchart 200 including steps in a method performed by the resource manager 14 in the system 10 of FIG. 1. Reference is also made to FIG. 1. The resource manager 14 is configured to: establish the parallel computing processes 28 of parallel computing job 1 on the server nodes 18 (block 202); request an unassigned symmetric memory key from the key manager 12 for parallel computing job 1 (block 204); receive the SMK1 from the key manager 12 for parallel computing job 1 (block 206); and provide (instances of) SMK1 to the parallel computing processes 28 of parallel computing job 1 running on the server nodes 28 (block 208).

Figure 3:
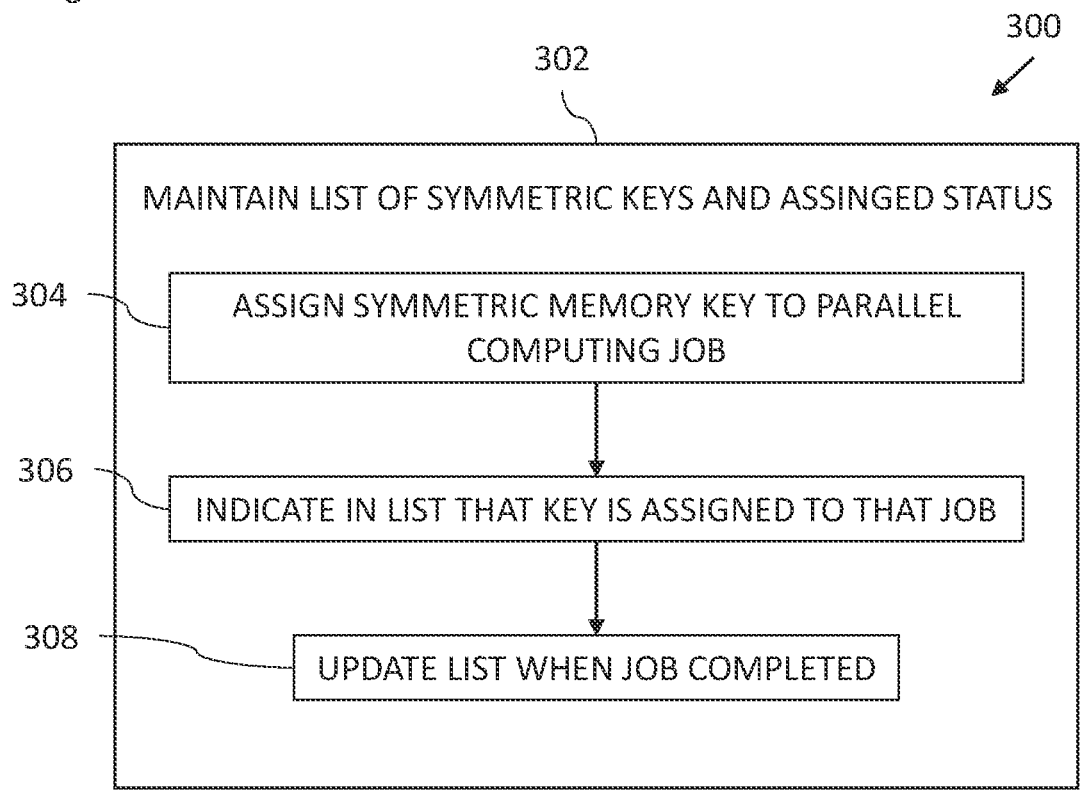
FIG. 3 is a flowchart including steps in a method performed by a key manager in the system of FIG. 1.

Reference is now made to FIG. 3, which is a flowchart 300 including steps in a method performed by the key manager 12 in the system 10 of FIG. 1. Reference is also made to FIG. 1. The key manager 12 is configured to: maintain a list 34 of which symmetric memory keys 26 are assigned to the active parallel computing jobs (block 302) (and which network interface controllers 24 are being used in the jobs to prevent the same key being assigned to different jobs using one or more of common network interface controllers 24) and optionally which symmetric memory keys 26 are unassigned to active parallel computing jobs and; assign one of the unassigned symmetric memory keys 26 (e.g., SMK1) to parallel computing job 1 in response to the request from the resource manager 14 (block 304); indicate in the list 34 that SMK1 is assigned to parallel computing job 1 (block 306); and in response to parallel computing job 1 being completed, update the list 34 to show that SMK1 is now unassigned to an active parallel computing job (block 308). An active parallel computing job is a parallel computing job which is being, or has been, setup for processing and has not yet completed processing.

In some embodiments, the key manager 12 may be configured to assign the same symmetric memory key to two or more different parallel computing jobs which do not use one or more common ones of the network interface controllers 24. In some embodiments, the key manager 12 may be configured to assign multiple symmetric memory keys to parallel computing job 1 (in response to a request by the resource manager 14). In such embodiments, each server node 18 is configured to cause registration of the multiple memory keys (assigned by the key manager 12 to parallel computing job 1) with corresponding multiple memory regions in a corresponding one of the network interface controllers 24.

To ensure the protection of the parallel computing job/application from intentional and unintentional SMK conflicts, the key manager 12 may encrypt and/or sign symmetric memory key(s) 26 to create a secure channel between the key manager 12 and the network interface controllers 24 of the server nodes 18. Therefore, in some embodiments, the network interface controller 24 includes one or more secret keys to decrypt and/or verify the symmetric memory key(s) 26.

Figure 4:
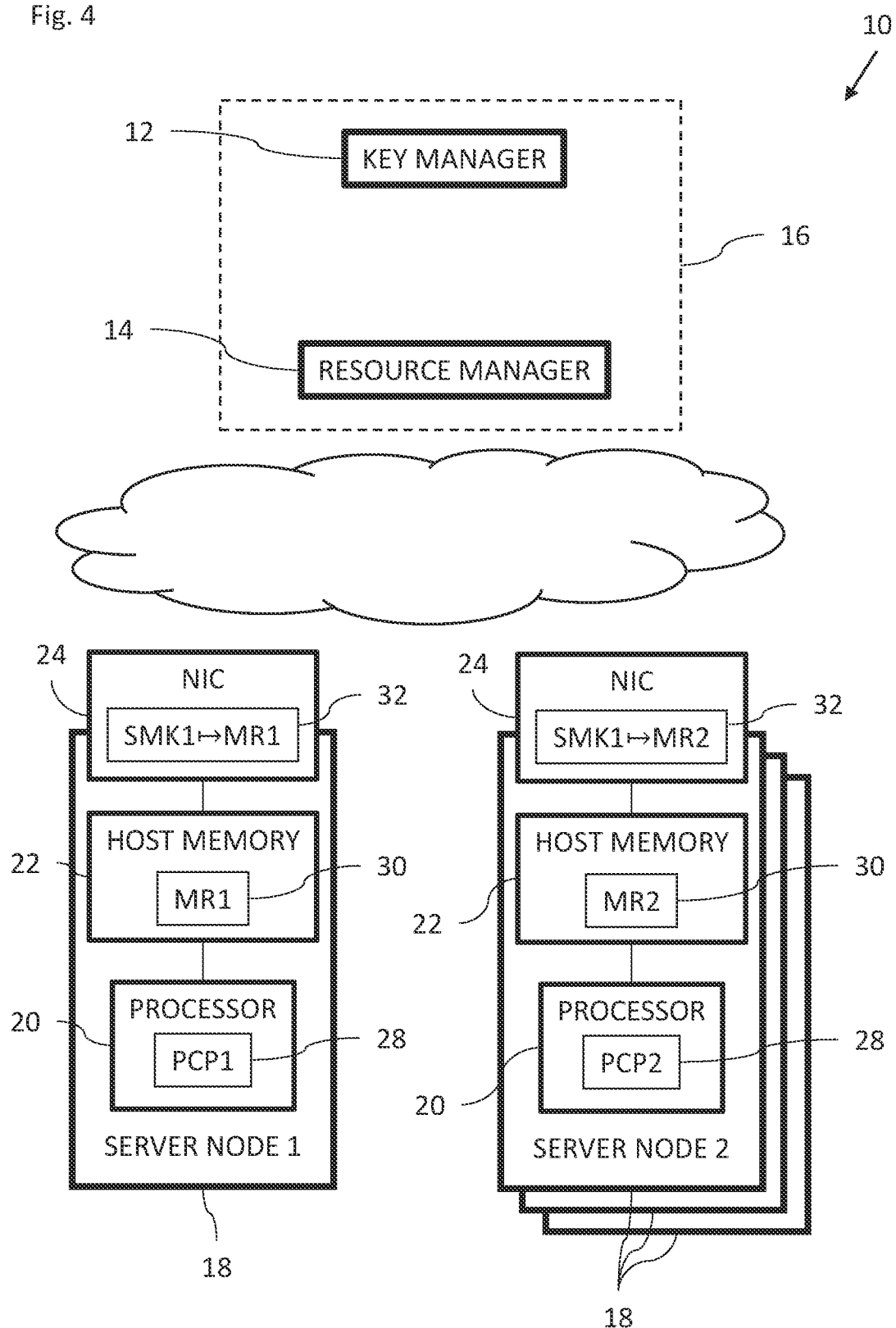
FIG. 4 is a block diagram view of the system of FIG. 1 illustrating memory key registration.

Reference is now made to FIGS. 4 and 5. FIG. 4 is a block diagram view of the system 10 of FIG. 1 illustrating memory key registration. FIG. 5 is a flowchart 500 including steps in a method performed by the processor 20 in server node 1 of the system 10 of FIG. 1 to initiate memory key registration.

The processor 20 of server node 1 is configured to: execute parallel computing process 1 (PCP1) of parallel computing job 1 (block 502); receive SMK1 from the resource manager 14 (block 504); select a memory region 30 (MR1) of the host memory 22 of server node 1 (block 506); and cause registration (block 32) of MR1 with SMK1 in the network interface controller 24 of server node 1 so that MR1 is accessible via that network interface controller 24 by different remote server nodes 28 (i.e., server nodes other than server node 1 which are also part of parallel computing job 1) with SMK1 using remote direct memory access (RDMA), including providing SMK1 and an identification of MR1 to the network interface controller 24 of server node 1 (block 508). The above steps are also performed by each of the other server nodes 18 that receive SMK1 from the resource manager 14 except that in each server node 18 a different process is performed (e.g., PCP2 in server node 2) and a different host memory region 30 may be selected (e.g. MR2 in server node 2) and registered (block 32) by the network interface controller 24 of that server node 18 (e.g., MR2 is registered with SMK1 by the network interface controller 24 of server node 2).

Reference is now made FIG. 6, which is a block diagram view of an example of parallel computing process 1 (PCP1) for use in the system 10 of FIG. 1. Reference is also made to FIG. 5. Parallel computing process 1 (block 600) may include parallel computing model 1 (block 602) and network library 1 (block 604).

One or more of the steps of blocks 502-508 may be performed by parallel computing model 1 and one or more of the steps of blocks 502-508 may be performed by network library 1. For example, parallel computing model 1 may perform the steps of blocks 502-506 and provide SMK1 and the identification of MR1 to network library 1 which then performs the step of block 508.

Similarly, PCP2 may include parallel computing model 2 and network library 2, and so on. In a similar manner as described above with respect to PCP1, one or more of the steps of blocks 502-508 may be performed by parallel computing model 2 and one or more of the steps of blocks 502-508 may be performed by network library 2 for PCP2. For example, parallel computing model 2 may perform the steps of blocks 502-506 and provide SMK1 and the identification of MR2 to network library 2 which then performs the step of block 508.

Reference is now made to FIG. 7, which is a flowchart 700 including steps in a method performed by the network interface controller 24 in server node 1 of the system 10 of FIG. 1 performing memory key registration (block 32). Reference is also made to FIG. 4. The network interface controller 24 of server node 1 is configured to: receive SMK1 and the identification of MR1 (block 702); and perform a registration (block 32) of MR1 with SMK1 (block 704). The network interface controllers 24 of the other server nodes 18 perform similar operations. For example, the network interface controller 24 of server node 2 is configured to receive SMK1 and the identification of MR2, and perform a registration of MR2 with SMK1.

Figure 8:
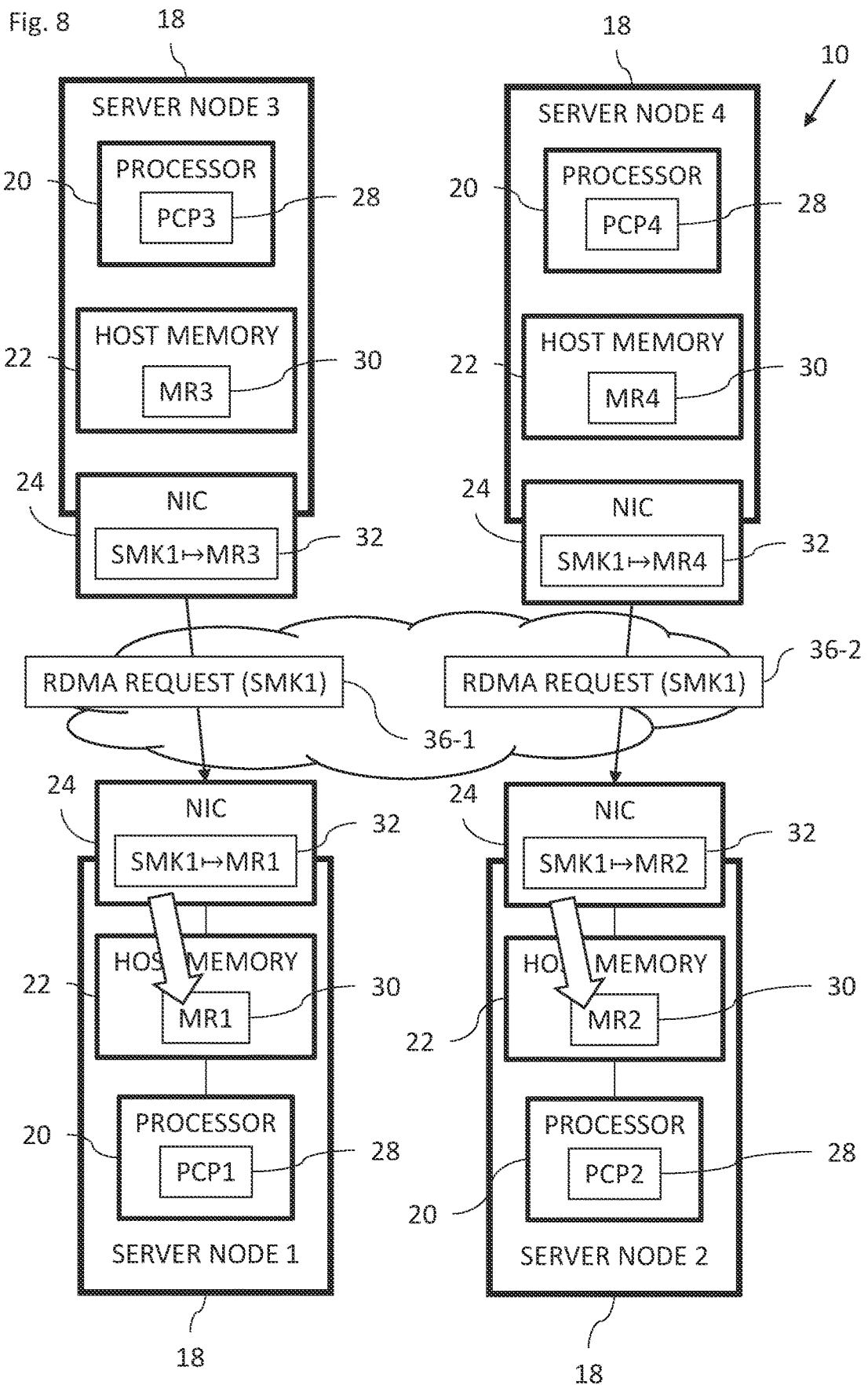
FIG. 8 is a block diagram view of the system of FIG. 1 illustrating two server nodes sending RDMA requests to two other server nodes.
Figure 9:
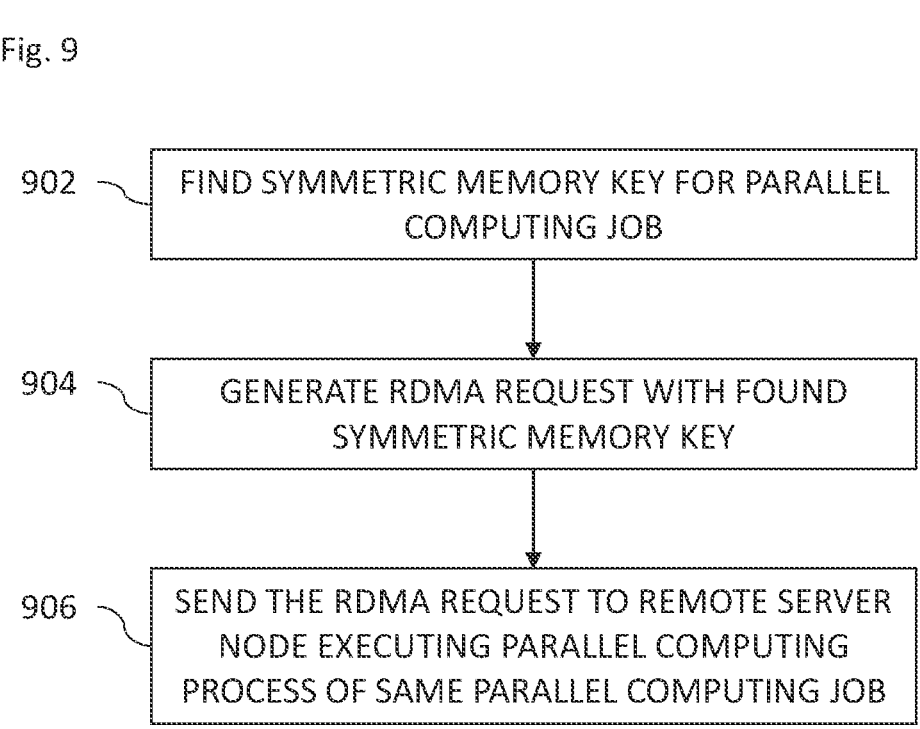
FIG. 9 is a flowchart including steps in a method performed by a parallel computing process in the system of FIG. 1 to generate and send an RDMA request.

Reference is now made to FIGS. 8 and 9. FIG. 8 is a block diagram view of the system 10 of FIG. 1 illustrating two server nodes (server nodes 3 and 4) sending RDMA requests 36-1, 36-2 to two other server nodes (server nodes 1 and 2, respectively). FIG. 9 is a flowchart 900 including steps in a method performed by a parallel computing process (e.g., PCP3) in the system 10 of FIG. 1 to generate and send the RDMA request 36-1. PCP3 is configured to find the symmetric memory key 26 (i.e., SMK1) for parallel computing job 1 of PCP3 in a memory (block 902), which may include a table of symmetric memory keys 26 for the parallel computing jobs being run by server node 3. PCP3 is configured to generate the RDMA request 36-1 with the found SM key (i.e., SMK1) (block 904), and send the generated RDMA request 36-1 to a remote server (e.g., server node 1), which is executing PCP1 of (the same) parallel computing job 1 (block 906). FIG. 8 also shows PCP4 running on server node 4 performing similar steps to generate the RDMA request 36-2 and sent the RDMA request 36-2 to server node 2.

Figure 10:
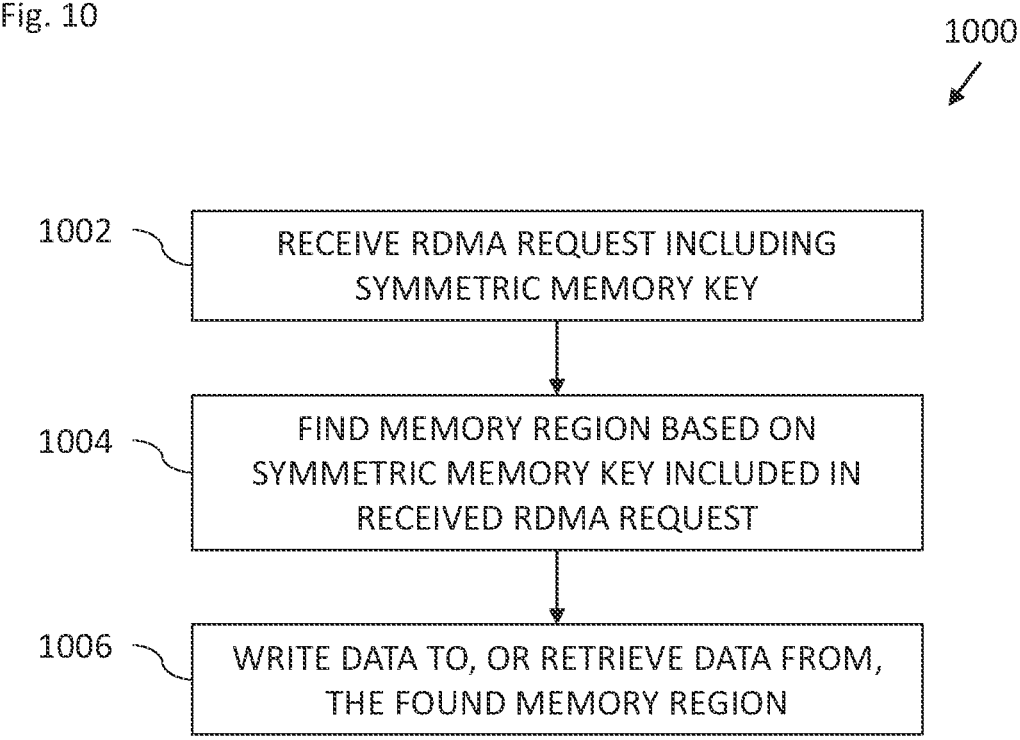
FIG. 10 is a flowchart including steps in a method performed by a network interface controller in the system of FIG. 1 processing a received RDMA request.

Reference is now made to FIG. 10, which is a flowchart 1000 including steps in a method performed by the network interface controller 24 of server node 1 in the system 10 of FIG. 1 processing the received RDMA request 36-1. Reference is also made to FIG. 8. The network interface controller 24 of server node 1 is configured to: receive from PCP3 of the parallel computing job 1 the RDMA request 36-1 including SMK1 (block 1002); find the memory region (i.e., MR1) in the host memory 22 of server node 1 corresponding to SMK1 based on SMK1 being included in the RDMA request 36-1 and the registration (block 32) previously performed mapping SMK1 to MR1 (block 1004); and write data to, or retrieve data from, MR1 of the host memory 22 of server node 1 responsively to the found memory region 30 (i.e., MR1) and the RDMA request 36-1, which is requesting performance of the RDMA process (block 1006).

Similarly, the network interface controller 24 of server node 2 is configured to: receive from PCP4 of the parallel computing job 1 the RDMA request 36-2 including SMK1; find MR2 in the host memory 22 of server node 2 based on SMK1 included in the RDMA request 36-2 and the registration (block 32) previously performed mapping SMK1 to MR2; and write data to, or retrieve data from, MR2 of the host memory 22 of server node 2 responsively to the found memory region 30 (i.e., MR2) and the RDMA request 36-2, which is requesting performance of the RDMA process.

Figure 11:
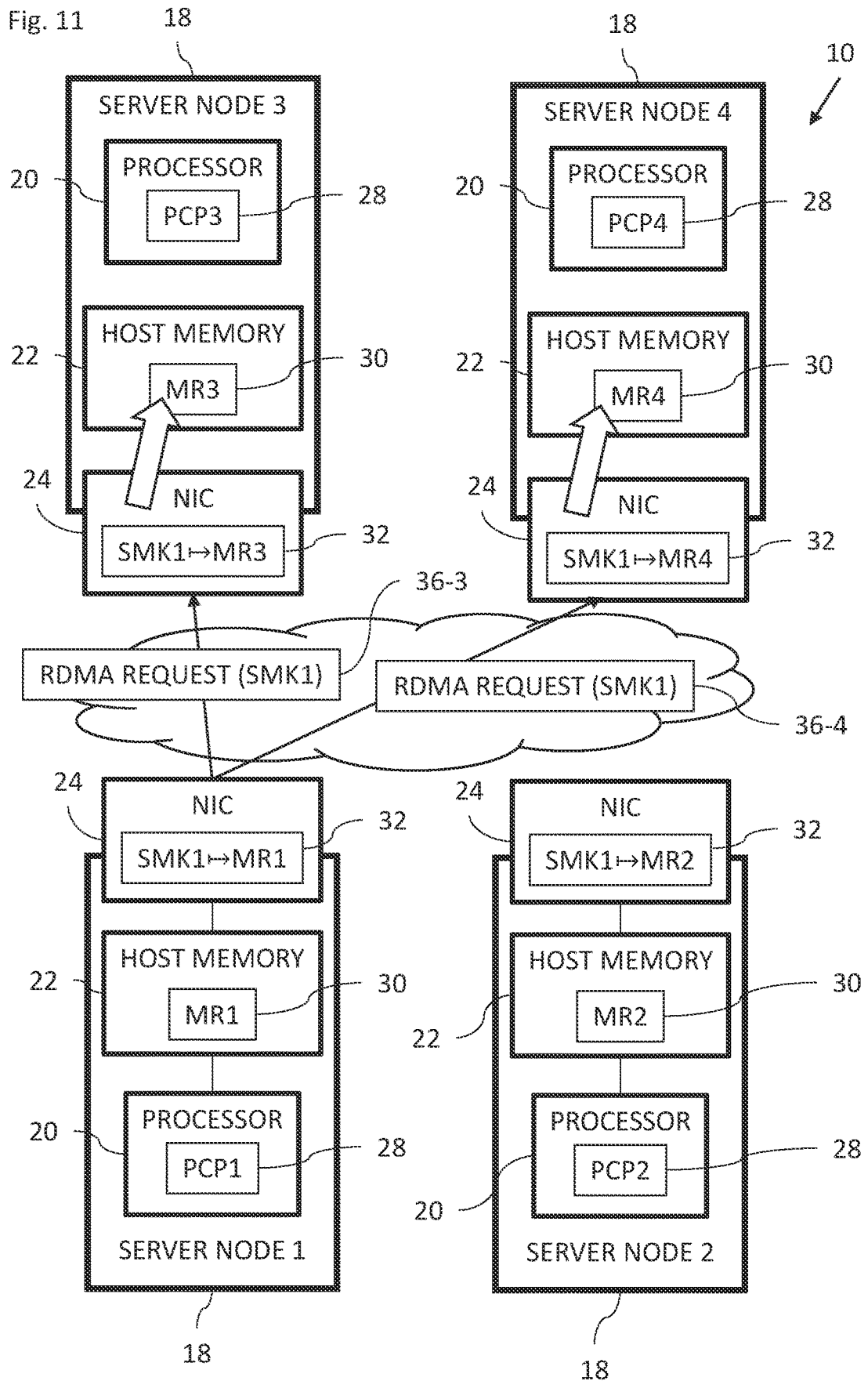
FIG. 11 is a block diagram view of the system of FIG. 1 showing a server node sending RDMA requests to different server nodes.

Reference is now made to FIG. 11, which is a block diagram view of the system 10 of FIG. 1 showing server node 1 sending RDMA requests 36-3, 36-4 to different server nodes (server nodes 3 and 4, respectively). PCP1 running on the processor 20 of server node 1 is configured to generate and send RDMA request 36-3 including SMK1 to access the host memory 22 of remote server node 3 (which is executing PCP3 of parallel computing job 1) with SMK1. Similarly, PCP1 running on the processor 20 of server node 1 is configured to generate and send RDMA request 36-4 including SMK1 to access the host memory 22 of remote server node 4 (which is executing PCP4 of parallel computing job 1) with SMK1.

Figure 12:
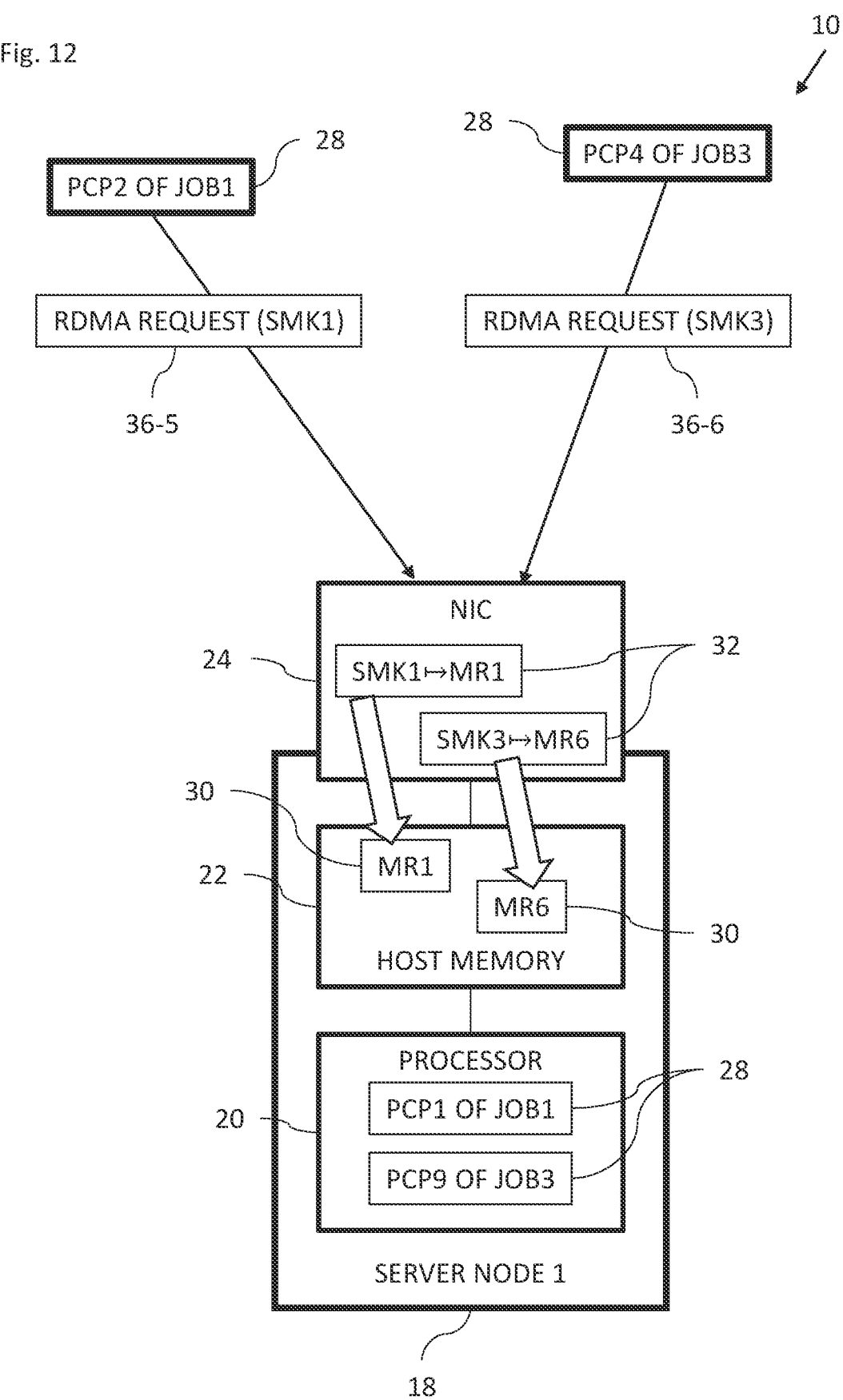
FIG. 12 is a block diagram view of the system of FIG. 1 showing two different processes of different parallel computing jobs sending RDMA requests to the same server node.

Reference is now made to FIG. 12, which is a block diagram view of the system 10 of FIG. 1 showing two different processes 28 of different parallel computing jobs (PCP2 of job 1 and PCP4 of job 3) sending RDMA requests to the same server node (server node 1). PCP2 and PCP4 may be running on the same server node 18 or on different server nodes 18.

PCP2 of parallel computing job 1 running on a server node (which is remote to server node 1) is configured to generate and send an RDMA request 36-5 including SMK1 to access the host memory 22 of server node 1 (which is executing PCP1 of parallel computing job 1) with SMK1.

PCP4 of parallel computing job 3 is running on a server node (which is remote to server node 1) and is configured to generate and send an RDMA request 36-6 including SMK3 (as SMK3 is the SM key assigned by the key manager 12 to parallel computing job 3) to access the host memory 22 of server node 1 (which is executing PCP9 of parallel computing job 3) with SMK3.

The network interface controller 24 of server node 1 is configured to: receive from PCP2 of the parallel computing job 1 the RDMA request 36-5 including SMK1; find MR1 in the host memory 22 of server node 1 based on SMK1 being included in the RDMA request 36-5 and the registration (block 32) previously performed mapping SMK1 to MR1; and write data to, or retrieve data from, MR1 of the host memory 22 of server node 1 responsively to the found memory region 30 (i.e., MR1) and the RDMA request 36-5, which is requesting performance of the RDMA process.

The network interface controller 24 of server node 1 is configured to: receive from PCP4 of the parallel computing job 3 the RDMA request 36-6 including SMK3; find MR6 in the host memory 22 of server node 1 based on SMK3 being included in the RDMA request 36-6 and the registration (block 32) previously performed mapping SMK3 to MR6; and write data to, or retrieve data from, MR6 of the host memory 22 of server node 1 responsively to the found memory region 30 (i.e., MR6) and the RDMA request 36-6, which is requesting performance of the RDMA process.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A parallel computing system, comprising:
a plurality of server nodes including respective processors configured to:
execute parallel computing processes of the first parallel computing job, symmetric memory keys being assigned by a key manager to parallel computing jobs including a first symmetric memory key to a first parallel computing job; and
cause registration of host memory regions of the server nodes with the assigned first symmetric memory key in corresponding network interface controllers of the server nodes so that different ones of the host memory regions are accessible with the first symmetric memory key by remote ones of the server nodes using remote direct memory access, wherein:
the server nodes include: a first server node including a first host memory and a first network interface controller; and a second server node including a second processor a second host memory, and a second interface controller;
the first network interface controller and the second interface controller are configured to provide network access to the first server node and the second server node, respectively;
the first network interface controller is configured to perform a first registration of a first memory region of the first host memory with the first symmetric memory key; and
the second network interface controller is configured to perform a second registration of a second memory region of the second host memory with the first symmetric memory key.

2. The system according to claim 1, wherein the first server node includes a first processor being configured to access one of the host memory regions of the second server node using remote direct memory access with the first symmetric memory key.

3. The system according to claim 1, wherein:
the first server node includes a first processor configured to:
execute a first parallel computing process of the first parallel computing job;
receive the first symmetric memory key;
select the first memory region of the first host memory; and
provide the first symmetric memory key and an identification of the first memory region to the first network interface controller;

the first network interface controller is configured to receive the first symmetric memory key and the identification of the first memory region;
the second server node includes a second processor is configured to:
execute a second parallel computing process of the first parallel computing job;
receive the first symmetric memory key;
select the second memory region of the second host memory; and
provide the first symmetric memory key and an identification of the second memory region to the second network interface controller; and
the second network interface controller is configured to receive the first symmetric memory key and the identification of the second memory region.

4. The system according to claim 3, wherein:
the first network interface controller is configured to receive from a third parallel computing process of the first parallel computing job a first remote direct memory access request including the first symmetric memory key; and
the second network interface controller is configured to receive from a fourth parallel computing process of the first parallel computing job a second remote direct memory access request including the first symmetric memory key.

5. The system according to claim 3, wherein:
the first network interface controller is configured to:
receive from a third parallel computing process of the first parallel computing job a first remote direct memory access request including the first symmetric memory key;
find the first memory region based on the first symmetric memory key included in the first remote direct memory access request and the first registration; and
write data to, or retrieve data from, the first memory region of the first host memory responsively to the found first memory region and the first remote direct memory access request; and
the second network interface controller is configured to:
receive from a fourth parallel computing process of the first parallel computing job a second remote direct memory access request including the first symmetric memory key;
find the second memory region based on the first symmetric memory key included in the second remote direct memory access request and the second registration; and
write data to, or retrieve data from, the second memory region of the second host memory responsively to the found second memory region and the second remote direct memory access request.

6. The system according to claim 3, wherein:
the first parallel computing process includes a first parallel computing model and a first network library;
the first processor is configured to execute the first parallel computing model to: receive the first symmetric memory key; select the first memory region of the first host memory; and provide the first symmetric memory key and the identification of the first memory region to the first network library;
the first processor is configured to execute the first network library to provide the first symmetric memory key and the identification of the first memory region to the first network interface controller;

the second parallel computing process includes a second parallel computing model and a second network library;

the second processor is configured to execute the second parallel computing model is to: receive the first symmetric memory key; select the second memory region of the second host memory; and provide the first symmetric memory key and the identification of the second memory region to the second network library; and the second processor is configured to execute the second network library to provide the first symmetric memory key and the identification of the second memory region to the second network interface controller.

7. The system according to claim 1, further comprising the key manager is configured to: maintain a list of which of the symmetric memory keys are unassigned to active parallel computing jobs and which of the symmetric memory keys are assigned to the active parallel computing jobs; and assign one of the unassigned symmetric memory keys to the first parallel computing job.

8. The system according to claim 7, further comprising a resource manager configured to:
establish the parallel computing processes of the first parallel computing job on the server nodes;
request an unassigned symmetric memory key from the key manager for the first parallel computing job;
receive the first symmetric memory key from the key manager for the first parallel computing job; and
provide the first symmetric memory key to the parallel computing processes of the first parallel computing job running on the server nodes, wherein the key manager is configured to indicate in the list that the first symmetric memory key is assigned to the first parallel computing job.

9. The system according to claim 1, wherein the key manager is configured to assign the same symmetric memory key to two different parallel computing jobs which do not use one or more common ones of the network interface controllers.

10. The system according to claim 1, wherein the key manager is configured to assign multiple symmetric memory keys to the first parallel computing job, wherein each of the server nodes is to cause registration of the multiple memory keys with corresponding multiple memory regions in a corresponding one of the network interface controllers.

11. A server node device, comprising:
a network interface controller to send and receive packets over a network; and
a host memory; and
a processor to:
execute a first parallel computing process of a parallel computing job;
receive a symmetric memory key from a key manager;
cause registration of a host memory region of the host memory with the symmetric memory key in the network interface controller so that the host memory region is accessible via the network interface controller by different remote server nodes with the symmetric memory key using remote direct memory access;
send a first remote direct memory access request including the symmetric memory key to access a host memory of a first remote server node executing a second parallel computing process of the parallel computing job with the symmetric memory key; and send a second remote direct memory access request including the symmetric memory key to access a host memory of a second remote server node executing a third parallel computing process of the parallel computing job with the symmetric memory key.

12. The device according to claim 11, wherein:
the processor is to:
select the memory region of the host memory; and
provide the symmetric memory key and an identification of the memory region to the network interface controller; and
the network interface controller is to:
receive the symmetric memory key and the identification of the memory region; and
perform the registration of the memory region with the symmetric memory key.

13. The device according to claim 12, wherein the first parallel computing process includes a first parallel computing model and a first network library.

14. The device according to claim 13, wherein the processor is configured to execute:
the first parallel computing model to:
receive the symmetric memory key;
select the memory region of the host memory; and
provide the symmetric memory key and the identification of the memory region to the first network library; and
the first network library to provide the symmetric memory key and the identification of the memory region to the network interface controller.

15. A parallel computing method, comprising:
assigning symmetric memory keys to parallel computing jobs including a first symmetric memory key to a first parallel computing job;
executing parallel computing processes of the first parallel computing job;
causing registration of host memory regions of server nodes with the assigned first symmetric memory key in corresponding network interface controllers of the server nodes so that different ones of the host memory regions are accessible with the first symmetric memory key by remote ones of the server nodes using remote direct memory access;
providing network access by a first network interface controller to a first server node;
providing network access by a second network interface controller to a second server node;
performing, by the first network interface controller, a first registration of a first memory region of a first host memory of the first server node with the first symmetric memory key; and
performing, by the second network interface controller, a second registration of a second memory region of a second host memory of the second server node with the first symmetric memory key.

16. The method according to claim 15, further comprising accessing, by a first server node, a host memory region of a second server node using remote direct memory access with the first symmetric memory key.

17. The method according to claim 15, further comprising:
by a first server node:
executing a first parallel computing process of the first parallel computing job;
receiving the first symmetric memory key;
selecting the first memory region of a first host memory of the first server node; and providing the first symmetric memory key and an identification of the first memory region to a first network interface controller of the first server node;

by the first network interface controller receiving the first symmetric memory key and the identification of the first memory region;

by a second server node:
executing a second parallel computing process of the first parallel computing job;
receiving the first symmetric memory key;
selecting the second memory region of a second host memory of the second server node; and
providing the first symmetric memory key and an identification of the second memory region to a second network interface controller of the second server node; and
by the second network interface controller receiving the first symmetric memory key and the identification of the second memory region.

18. The method according to claim 17, further comprising:
receiving, by the first network interface controller, from a third parallel computing process of the first parallel computing job a first remote direct memory access request including the first symmetric memory key; and
receiving, by the second network interface controller, from a fourth parallel computing process of the first parallel computing job a second remote direct memory access request including the first symmetric memory key.

19. The method according to claim 17, further comprising:
by the first network interface controller:
receiving from a third parallel computing process of the first parallel computing job a first remote direct memory access request including the first symmetric memory key;
finding the first memory region based on the first symmetric memory key included in the first remote direct memory access request and the first registration; and
writing data to, or retrieving data from, the first memory region of the first host memory responsively to the found first memory region and the first remote direct memory access request; and
by the second network interface controller:
receiving from a fourth parallel computing process of the first parallel computing job a second remote direct memory access request including the first symmetric memory key;
finding the second memory region based on the first symmetric memory key included in the second remote direct memory access request and the second registration; and
writing data to, or retrieving data from, the second memory region of the second host memory responsively to the found second memory region and the second remote direct memory access request.

20. The method according to claim 17, wherein the first parallel computing process includes a first parallel computing model and a first network library, the second parallel computing process including a second parallel computing model and a second network library, the method further comprising:
by the first parallel computing model: receiving the first symmetric memory key; selecting the first memory region of the first host memory; and providing the first symmetric memory key and the identification of the first memory region to the first network library;
providing, by the first network library, the first symmetric memory key and the identification of the first memory region to the first network interface controller;
by the second parallel computing model: receiving the first symmetric memory key; selecting the second memory region of the second host memory; and providing the first symmetric memory key and the identification of the second memory region to the second network library; and
providing, by the second network library, the first symmetric memory key and the identification of the second memory region to the second network interface controller.

21. The method according to claim 17, further comprising:
maintaining a list of which of the symmetric memory keys are unassigned to active parallel computing jobs and which of the symmetric memory keys are assigned to the active parallel computing jobs; and
assigning one of the unassigned symmetric memory keys to the first parallel computing job.

22. The method according to claim 21, further comprising:
establishing the parallel computing processes of the first parallel computing job on the server nodes;
requesting an unassigned symmetric memory key from a key manager for the first parallel computing job;
receiving the first symmetric memory key from the key manager for the first parallel computing job;
providing the first symmetric memory key to the parallel computing processes of the first parallel computing job running on the server nodes; and
indicating in the list that the first symmetric memory key is assigned to the first parallel computing job.

23. The method according to claim 15, further comprising assigning the same symmetric memory key to two different parallel computing jobs which do not use one or more common ones of the network interface controllers.

24. The method according to claim 15, further comprising:
assigning multiple symmetric memory keys to the first parallel computing job; and
causing registration of the multiple memory keys with corresponding multiple memory regions in a corresponding one of the network interface controllers.

25. A parallel computing method, comprising:
sending and receiving packets over a network;
executing a first parallel computing process of a parallel computing job;
receiving a symmetric memory key from a key manager;
causing registration of a host memory region of a host memory with the symmetric memory key in a network interface controller so that the host memory region is accessible via the network interface controller by different remote server nodes with the symmetric memory key using remote direct memory access;
sending a first remote direct memory access request including the symmetric memory key to access a host memory of a first remote server node executing a second parallel computing process of the parallel computing job with the symmetric memory key; and
sending a second remote direct memory access request including the symmetric memory key to access a host memory of a second remote server node executing a third parallel computing process of the parallel computing job with the symmetric memory key.

26. The method according to claim 25, further comprising:
- selecting the memory region of the host memory;
- providing the symmetric memory key and an identification of the memory region to the network interface controller;
- receiving, by the network interface controller, the symmetric memory key and the identification of the memory region; and
- performing the registration of the memory region with the symmetric memory key.

* * * * *